United States Patent Office.

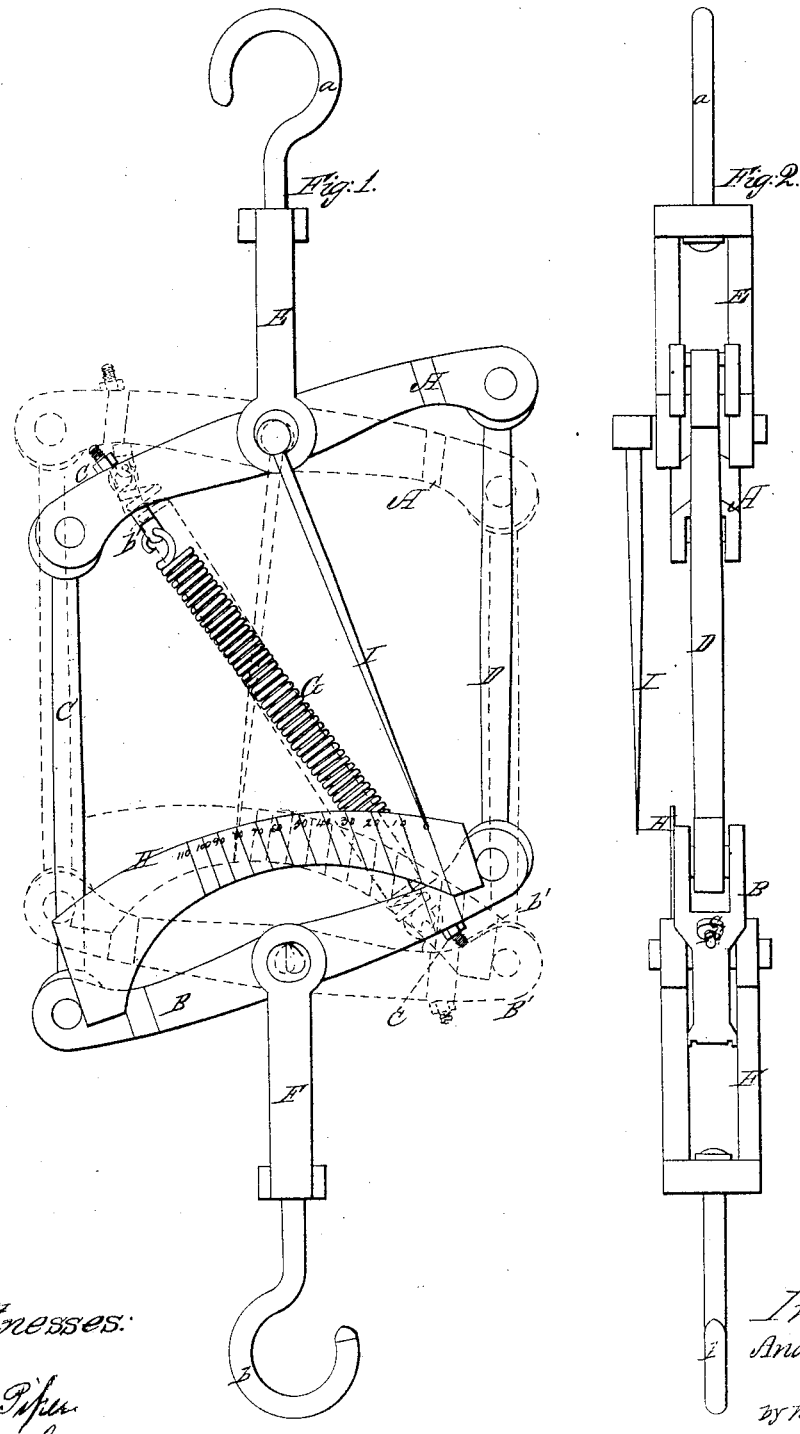

ANDREW MORSE, OF SKOWHEGAN, MAINE, ASSIGNOR TO HIMSELF AND THOMAS ODIORNE, OF CAMBRIDGE, MASSACHUSETTS.

Letters Patent No. 103,818, dated May 31, 1870.

IMPROVEMENT IN SPRING WEIGHING APPARATUS.

The Schedule referred to in these Letters Patent and making part of the same

*To all persons to whom these presents may come:*

Be it known that I, ANDREW MORSE, of Skowhegan, of the county of Somerset and State of Maine, have invented a new and useful or Improved Apparatus for Weighing Heavy Bodies; and do hereby declare the same to be fully described in the following specification and represented in the accompanying drawing, of which—

Figure 1 denotes a front elevation, and
Figure 2 an edge view of it.

The apparatus is designed by me for use, either within or without a ships "block." In either case, it may be arranged so as to indicate the weight or strain to which the block may be subjected in raising an article. It may be suspended from a block, and the article to be raised may be appended to the lower hook of the apparatus, in which case the weight of the article may be ascertained by the apparatus. I would also remark that the apparatus may be otherwise used for weighing objects.

In the drawing—

A and B denote two levers of equal length, conjoined by two vertical rods C D, which are also equal in length, and at their ends are jointed to the ends of the levers, the said levers being arranged in inclined positions to the horizon, while the rods are disposed vertically.

Near its middle each lever is provided with knife-edges to give support to one of two hangers E F, each of which is furnished with a hook, *a* or *b*, and is formed and arranged, with respect to the levers, in manner as represented.

A helical spring G is extended diagonally or obliquely across the space between the levers and their connecting-rods, and is connected to the two levers or to screw-bolts *b' b'*, going through them and provided with nuts *c c*.

Furthermore, a scale or divided bar H is fastened to and arranged upon the lower lever, and operates with an index pointer I, which is projected from one of the knife-edge bearings of the upper lever, the whole being as represented in the drawing. The fulcrum of each of the two levers is not to be disposed at the middle of the lever, but somewhat aside thereof or at a small distance therefrom, thereby making one arm of the lever shorter than the other, the longer arm of the upper lever being arranged directly over the shorter arm of the lower lever. The spring is to be connected to the shorter arms of the levers.

By pulling the two hooks in opposite directions there will be a tendency to draw the levers into positions as represented at A' B', (by dotted lines in fig. 1,) which tendency will be resisted by the spring. As it and the levers may move under the strain, the index pointer will move over the arc or scale, and indicate thereon the amount of the force of traction.

Should the elasticity of the spring be lessened by use of the apparatus, so as to cause the index pointer not to rest over the zero of the scale when no weight is suspended from the lower hook, we can restore the index pointer to its proper position by simply sufficiently setting up one or both of the nuts of the screw-bolts.

I claim the combination of the two levers A B, their connecting-rods C D, the hangers E F, index pointer I, the scale H, and the spring G or its equivalent, the whole being arranged and applied together, substantially in manner, and to operate as and for the purpose as explained.

ANDREW MORSE.

Witnesses:
R. H. EDDY,
J. R. SNOW.